(12) United States Patent
Santiago et al.

(10) Patent No.: US 11,577,814 B2
(45) Date of Patent: Feb. 14, 2023

(54) COMPOSITE STRUCTURE AND METHOD OF FORMING

(71) Applicant: The Boeing Company, Chicago, IL (US)

(72) Inventors: Jonathan Santiago, Tukwila, WA (US); John Dempsey Morris, Seattle, WA (US); Derek Flolid, Bothell, WA (US); Michael Alan Lee, Tukwila, WA (US); Marco Tullio B Ciccu, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/471,402

(22) Filed: Sep. 10, 2021

(65) Prior Publication Data

US 2022/0194546 A1 Jun. 23, 2022

Related U.S. Application Data

(60) Provisional application No. 63/127,626, filed on Dec. 18, 2020.

(51) Int. Cl.
*B64C 1/06* (2006.01)
*B64C 1/00* (2006.01)

(52) U.S. Cl.
CPC ...... *B64C 1/064* (2013.01); *B64C 2001/0072* (2013.01)

(58) Field of Classification Search
None
See application file for complete search history.

(56) References Cited

U.S. PATENT DOCUMENTS 7,469,735 B2 12/2008 Brown et al.
10,099,445 B2 10/2018 Kismarton

*Primary Examiner* — Alexander S Thomas
(74) *Attorney, Agent, or Firm* — Armstrong Teasdale LLP

(57) ABSTRACT

A composite structure including a multi-layer laminate having a plurality of regions each oriented out of plane relative to an adjacent region, and each extending in a longitudinal dimension of the multi-layer laminate, wherein the multi-layer laminate includes at least one ply layer having an oblique fiber orientation relative to the longitudinal dimension, and wherein the at least one ply layer includes a first section and a second section each having a side edge, the first and second sections aligned side-by-side such that a first interface defined between the respective side edges is oriented to extend in the longitudinal dimension.

20 Claims, 5 Drawing Sheets

| Ply Layer | Subsection | Fiber Orientation | X Start | X End | Y Start | Y End |
|---|---|---|---|---|---|---|
| 1 | 1_1 | 45 | 0 | 50 | 0 | 3.33 |
|  | 1_2 | 45 | 0 | 50 | 3.33 | 6.67 |
|  | 1_3 | 45 | 0 | 50 | 6.67 | 10 |
| 2 | 2_1 | 90 | 0 | 50 | 0 | 10 |
| 3 | 3_1 | -45 | 0 | 50 | 0 | 3.33 |
|  | 3_2 | -45 | 0 | 50 | 3.33 | 6.67 |
|  | 3_3 | -45 | 0 | 50 | 6.67 | 10 |
| 4 | 4_1 | 0 | 0 | 50 | 0 | 10 |

COMPOSITE STRUCTURE AND METHOD OF FORMING

CROSS-REFERENCE TO RELATED APPLICATIONS

This application claims priority to U.S. Application Ser. No. 63/127,626, filed Dec. 18, 2020, and entitled COMPOSITE STRUCTURE AND METHOD OF FORMING, which is hereby incorporated by reference in its entirety.

FIELD

The field relates generally to the manufacture of composite structures and, more specifically, to the manufacture of contoured composite structures from at least one discontinuous ply to reduce ply wrinkling.

BACKGROUND

Composite stiffeners such as spars and stringers are used in a wide range of aerospace, marine, and other applications. In some cases, stiffeners must be contoured with a radius of curvature along their length to conform to the geometry of a structure, such as an aircraft wing or fuselage skin.

Punch forming is one technique for fabricating contoured composite stiffeners. Punch forming includes forcing a flat composite laminate charge into a die with a punch to achieve a desired cross-sectional shape. Both the punch and the die may be articulated along their lengths, allowing them to bend. Once the charge has been punch formed to the desired cross-sectional shape, the punch and the die may be forced to bend, thereby forming the stiffener to the desired contour. However, difficulties arise in fabricating composite stiffeners that are highly contoured. For example, as the formed charge is bent to the desired contour, portions of the charge, such as the webs in a hat stiffener, are placed in compression, resulting in undesired wrinkling of some of the plies of the charge. Hand rework of the stiffeners is required to eliminate the wrinkling, adding to labor costs and reducing production rate.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is a composite structure including a multi-layer laminate including a plurality of regions each oriented out of plane relative to an adjacent region, and each extending in a longitudinal dimension of the multi-layer laminate, wherein the multi-layer laminate includes at least one ply layer having an oblique fiber orientation relative to the longitudinal dimension, and wherein the at least one ply layer includes a first section and a second section each having a side edge, the first and second sections aligned side-by-side such that a first interface defined between the respective side edges is oriented to extend in the longitudinal dimension.

Another aspect is an aircraft including a stringer. The stringer includes a multi-layer laminate including a plurality of regions each oriented out of plane relative to an adjacent region, and each extending in a longitudinal dimension of the multi-layer laminate, wherein the multi-layer laminate includes at least one ply layer having an oblique fiber orientation relative to the longitudinal dimension, and wherein the at least one ply layer includes a first section and a second section each having a side edge, the first and second sections aligned side-by-side such that a first interface defined between the respective side edges is oriented to extend in the longitudinal dimension.

Yet another aspect is a method of forming a composite structure. The method includes forming a multi-layer laminate having a plurality of regions defined in a crosswise dimension of the multi-layer laminate, the multi-layer laminate formed from at least one ply layer having an oblique fiber orientation relative to a longitudinal dimension of the multi-layer laminate, wherein the at least one ply layer comprises a first section and a second section each having a side edge, the first and second sections aligned side-by-side such that a first interface defined between the respective side edges is oriented to extend in the longitudinal dimension, and forming the multi-layer laminate into a desired shape. The forming includes orienting each of the plurality of regions of the multi-layer laminate out of plane relative to an adjacent region, and orienting the multi-layer laminate to define at least one curved section in the longitudinal dimension, wherein the first and second sections are configured to permit selective relative movement therebetween, prior to curing of the multi-layer laminate, as the at least one curved section is formed.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Examples described below include systems and methods of manufacturing a contoured composite structure from a multi-layer laminate including at least one discontinuous ply layer. The composite structure may be formed by bending the laminate sheet into a three-dimensional structure, such as a hat stiffener. The composite structure may also be bent along its longitudinal axis to define at least one section having a radius of curvature. In the examples described below, the discontinuous ply layer extends through the curved sections of the composite structure to reduce wrinkling within the laminate. The use of 45 degree plies within the laminate generally enables the resulting composite structure to be bent to more severe curvatures. Without being bound by any particular theory, it is believed that when 45 degree plies of a multi-layer laminate are put in tension in the web when going over a skin ramp, stress runs through to the flange, causing wrinkles to form in the resulting contoured structure. Defining a discontinuity in at least one 45 degree ply of the laminate defines distinct sections of the ply that may be released, unconstrained, and/or permits relative movement between each other as the composite structure is contoured to a desired shape prior to curing. When going over a skin ramp or severe contour, the use of continuous 45 degree plies below the neutral axis put the adjacent zero degree plies in compression, causing wrinkles to be formed. Conversely, above the neutral axis, the continuous 45 degree plies place the adjacent zero degree plies in tension.

In the past, one method to reduce or eliminate wrinkles was to cut one or more zero degree plies of the laminate to make them discontinuous. In one embodiment described herein, the slitting or cutting of 45 degree plies is implemented in addition to the discontinuous zero degree plies, which may potentially enable composite structures to be formed with a tighter radius of curvature and smaller skin ramp ratios. Cutting the 45 degree ply reduces the overall tension and compression stress and subsequent strain in each segment (lower flange, lower radius, web, upper radius and upper flange), thereby reducing the amount of zero degree fiber distortion that can results in wrinkles. Accordingly, contoured composite structures can be made with reduced ply wrinkling to be fabricated in a high speed, repeatable, and consistent manner.

As used herein, an element or step recited in the singular and preceded with the word "a" or "an" should be understood as not excluding plural elements or steps, unless such exclusion is explicitly recited. Furthermore, references to "example", "example implementation" or "one implementation" of the present disclosure are not intended to be interpreted as excluding the existence of additional implementations that also incorporate the recited features.

Figure 1:
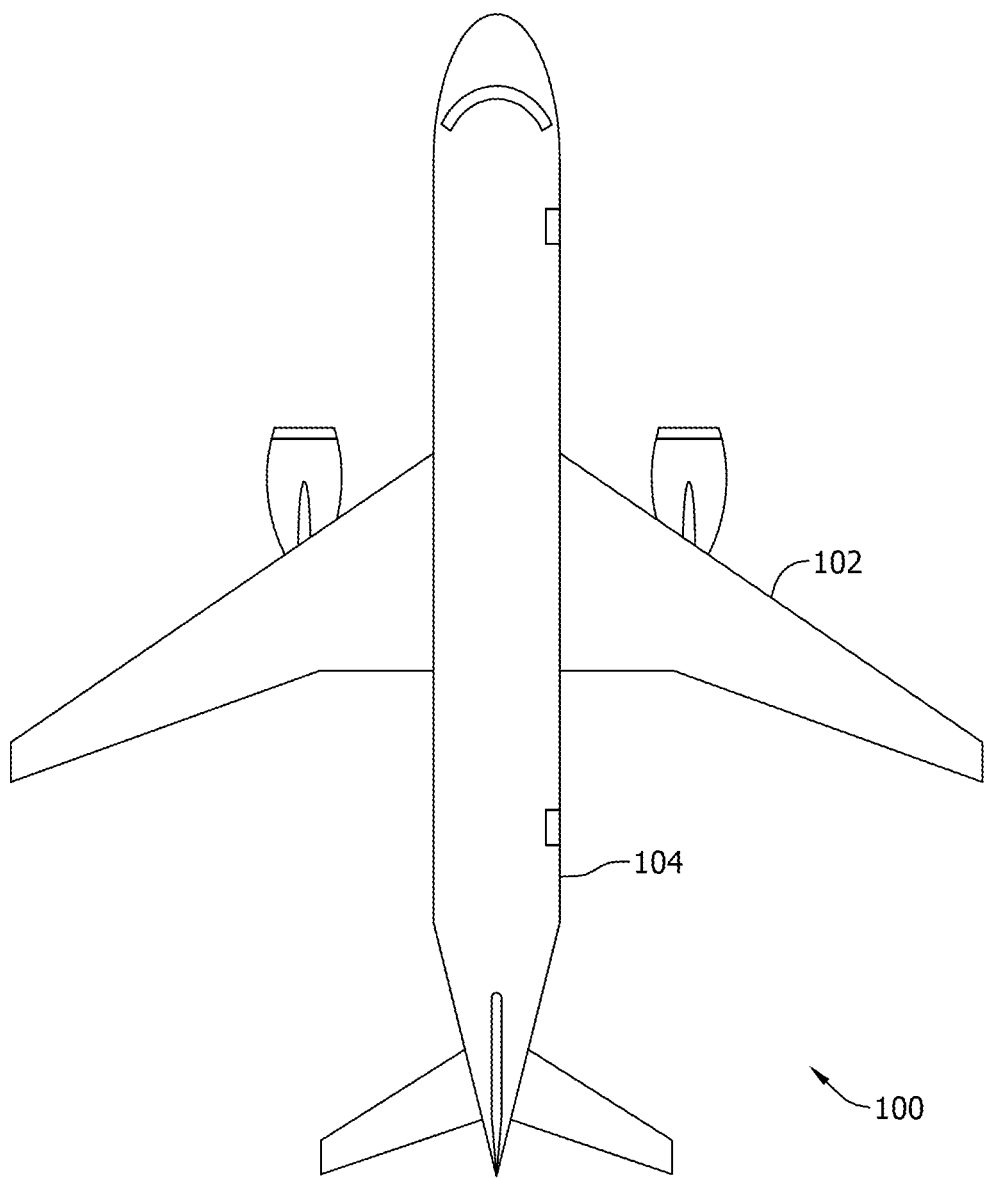
FIG. 1 is a top view of an example aircraft.

FIG. 1 is a top view of an example aircraft 100. Aircraft 100 includes a wing structure 102 coupled to and extending from a fuselage 104. Wing structure 102, fuselage 104, and/or other portions of aircraft 100 may be fabricated from one or more stiffeners (i.e. stringers) (not shown in FIG. 1). As used herein, the term "aircraft" may include, but is not limited to only including, airplanes, unmanned aerial vehicles (UAVs), gliders, helicopters, and/or any other object that travels through airspace. Moreover, it should be understood that, although an aerospace example is shown, the principles of the disclosure may be applied to other structures, such as a maritime structure or an automotive structure.

Figure 2:
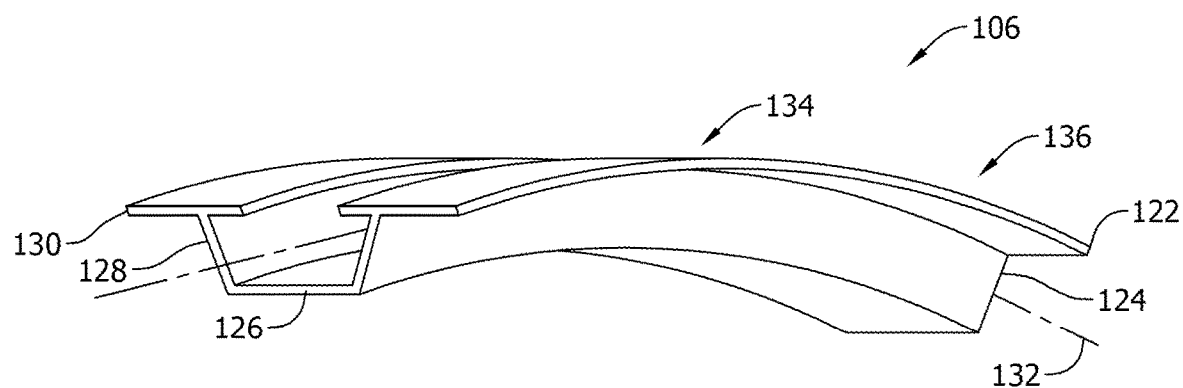
FIG. 2 is a perspective view illustration of a contoured composite structure that may be used in the aircraft shown in FIG. 1.

FIG. 2 is a perspective view illustration of a contoured composite structure 106 that may be used in aircraft 100 (shown in FIG. 1). In the example embodiment, composite structure 106 has a hat-shaped cross-sectional shape. However, the present disclosure may also be applicable to the fabrication of other stiffeners, stringers, or composite structures having any desired cross-sectional shape, such as a Z-shape, a J-shape, an I-shape, and the like.

Figure 3:
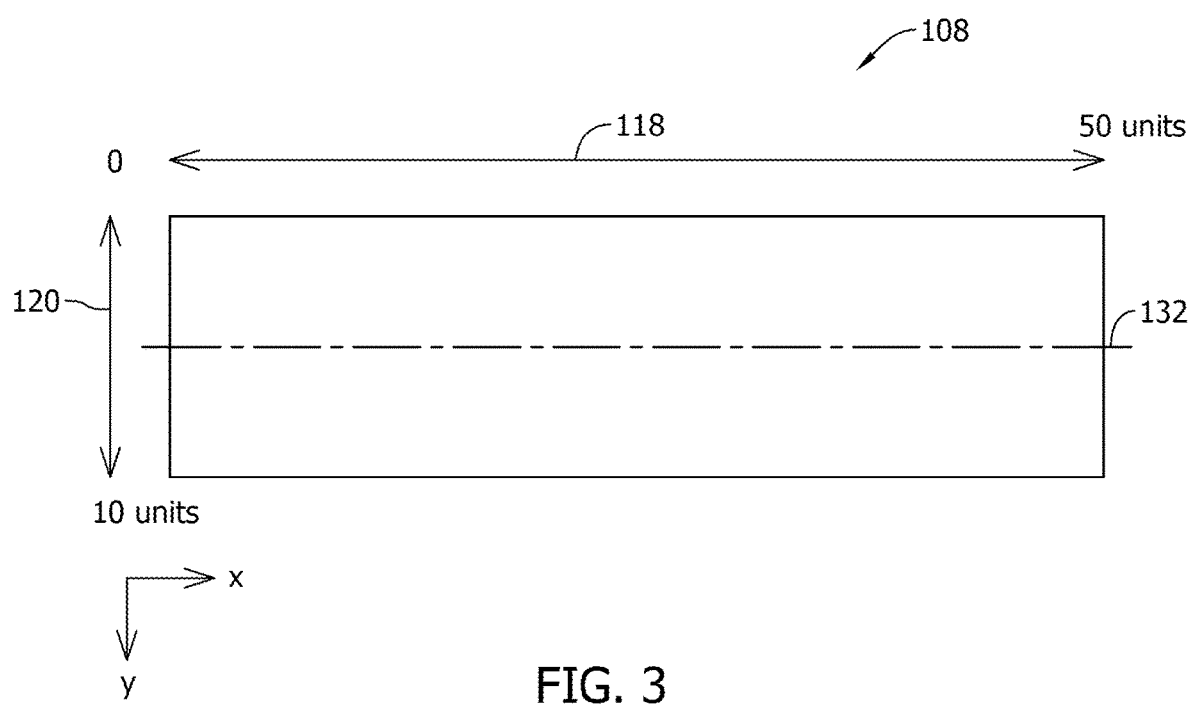
FIG. 3 illustrates a multi-layer laminate that may be used to form the composite structure shown in FIG. 2.

As will be discussed below in more detail, composite structure 106 may be formed from a multi-layer laminate 108 (shown in FIG. 3) of fiber reinforced ply layers. For example, referring to FIGS. 3 and 4, multi-layer laminate 108 includes at least a first ply layer 110, a second ply layer 112, a third ply layer 114, and a fourth ply layer 116. Ply layers 110, 112, 114, and 116 may be fabricated from any material that enables composite structure 106 (shown in FIG. 2) to function as described herein, such as, without limitation, carbon fiber reinforced plastic. In addition, ply layers 110, 112, 114, and 116 may have any fiber orientation, such as a 0 degree fiber orientation, a 90 degree fiber orientation, or an oblique fiber orientation (e.g., ±45 degrees). At least one ply layer (e.g., first and third ply layers 110 and 114) of multi-layer laminate 108 has an oblique fiber orientation, as will be described in more detail below.

Multi-layer laminate 108 has a longitudinal dimension 118 and a crosswise dimension 120. As illustrated in FIG. 2, composite structure 106 has a plurality of regions including a first region 122 (first flange), a second region 124 (first web), a third region 126 (cap), a fourth region 128 (second web), and a fifth region 130 (second flange) corresponding to distinct regions of multi-layer laminate 108. Regions 122, 124, 126, 128, and 130 are arranged in series in crosswise dimension 120 of multi-layer laminate, and are oriented to extend in longitudinal dimension 118. Each region 122, 124, 126, 128, and 130 is oriented out of plane with an adjacent region to define the hat-shaped cross-sectional shape of composite structure 106. In an alternative embodiment, composite structure 106 may have any number of regions that enables composite structure 106 to have a desired cross-sectional shape.

Multi-layer laminate 108 may be bent or contoured to define the hat-shaped cross-sectional shape of composite structure 106 in any suitable fabrication process such as, but not limited to, a punch forming, a drape forming, a lash forming, a vacuum forming, and a resin transfer forming process. The fabrication process may also be used to define a radius of curvature in composite structure 106. For example, referring again to FIG. 2, multi-layer laminate 108 may be contoured at one or more locations anywhere along its longitudinal axis 132 to define at least one curved section 134 and at least one straight section 136 in longitudinal dimension 118. As used herein, the terms "radial curvature" or "radius of curvature" refer to a curvature of a structure defined by the radius of a circular arc.

Figure 4:
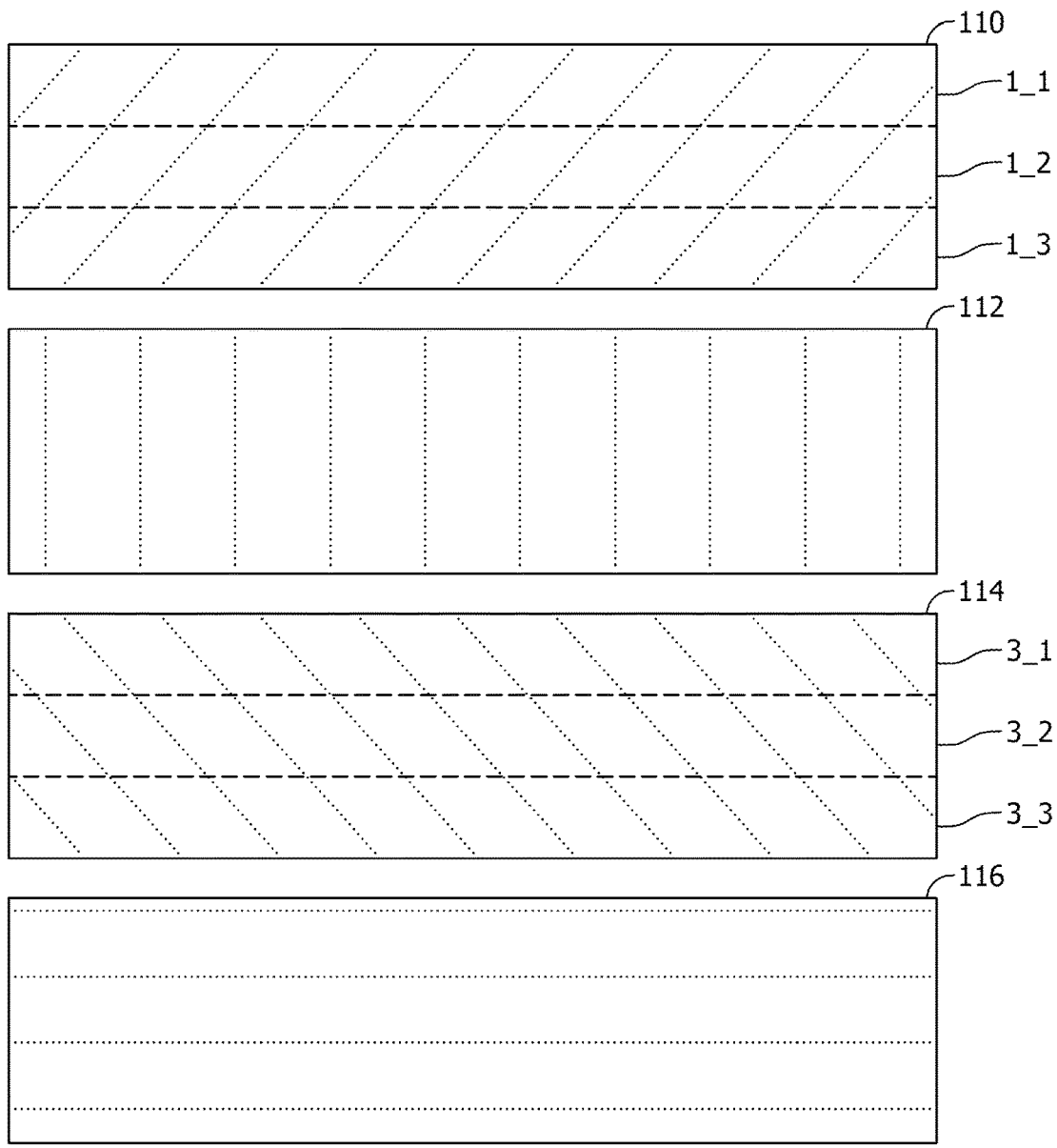
FIG. 4 illustrates a layer-by-layer view of one example of the multi-layer laminate shown in FIG. 3, and a layup table associated with the example.

As noted above, it is believed that when 45 degree plies of a multi-layer laminate are put in tension in the web as a radius of curvature is defined, stress runs through to the flange causing wrinkles to form in the resulting contoured structure, such as in third region 126. Accordingly, the ply layers of multi-layer laminate 108 having an oblique fiber orientation have discontinuities defined therein to mitigate the formation of wrinkles as the radius of curvature is defined, as will be described in more detail below. In one example, as shown in FIG. 4, ply layers 110 and 114, which have oblique fiber orientations, extend the full length of multi-layer laminate 108.

Figure 5:
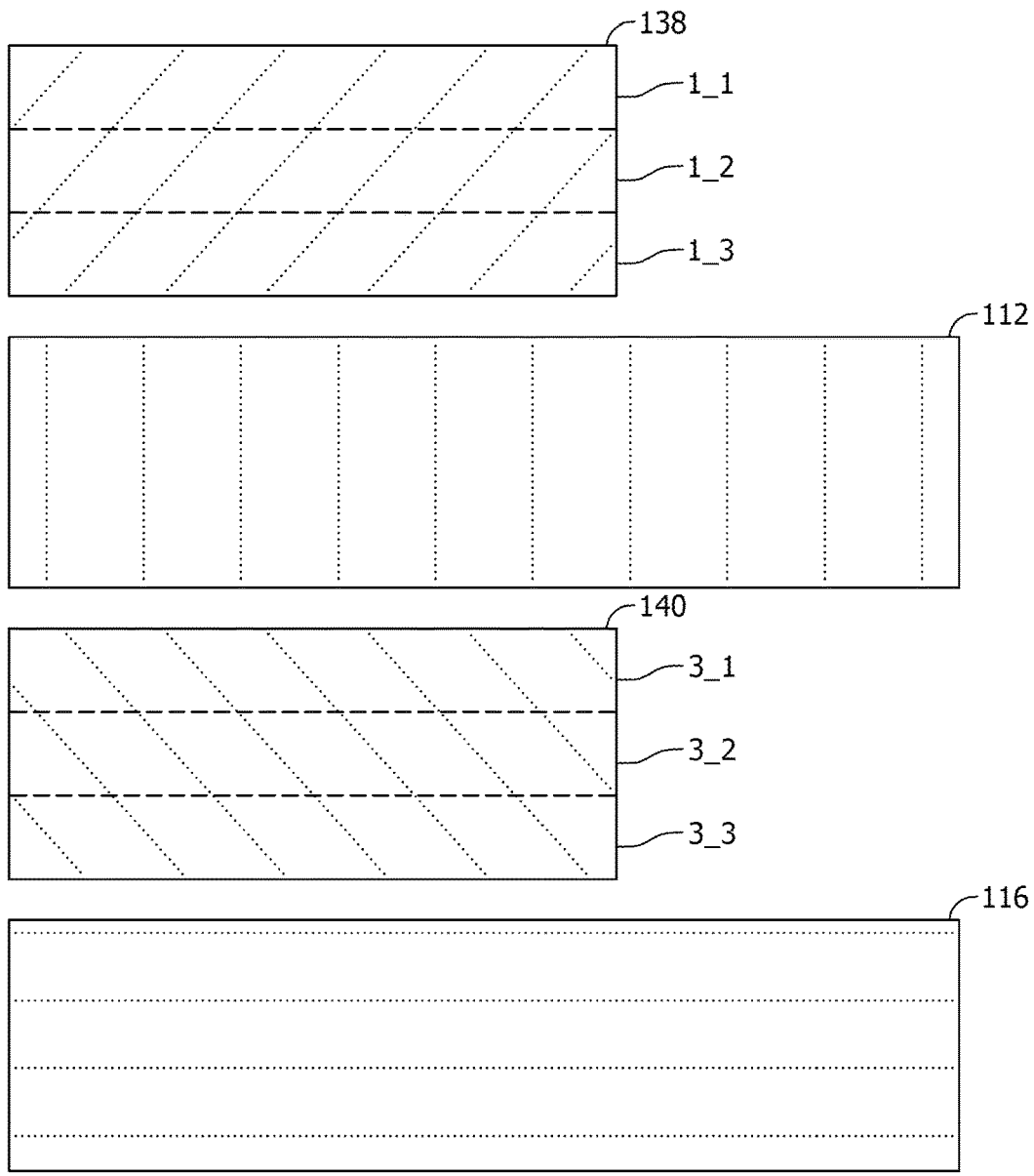
FIG. 5 illustrates a layer-by-layer view of another example of the multi-layer laminate shown in FIG. 3, and a layup table associated with the example.

Alternatively, it is generally known in which locations curved section 134 and straight section 136 will be defined on composite structure 106 (shown in FIG. 2) prior to contouring multi-layer laminate 108 to the desired shape. Accordingly, as shown in FIG. 5, multi-layer laminate 108 includes first and third ply layers 138 and 140 that extend only within lengths of multi-layer laminate 108 that correspond to the at least one curved section 134 (shown in FIG. 2) of composite structure 106, and not within the at least one straight section 136 (shown in FIG. 2). Alternatively, layers 138 and 140 may be positioned to extend only within lengths of multi-layer laminate 108 that correspond to sections of composite structure 106 that will be formed with a radius of curvature greater than a threshold. The threshold may be 50 inches, 100 inches, 250 inches, or 500 inches, for example. Thus, the overall length of ply layers 138 and 140 are shorter than ply layers 110 and 114, for example, and extend only along select lengths of multi-layer laminate 108 to facilitate reducing the weight of composite structure 106.

Figure 6:
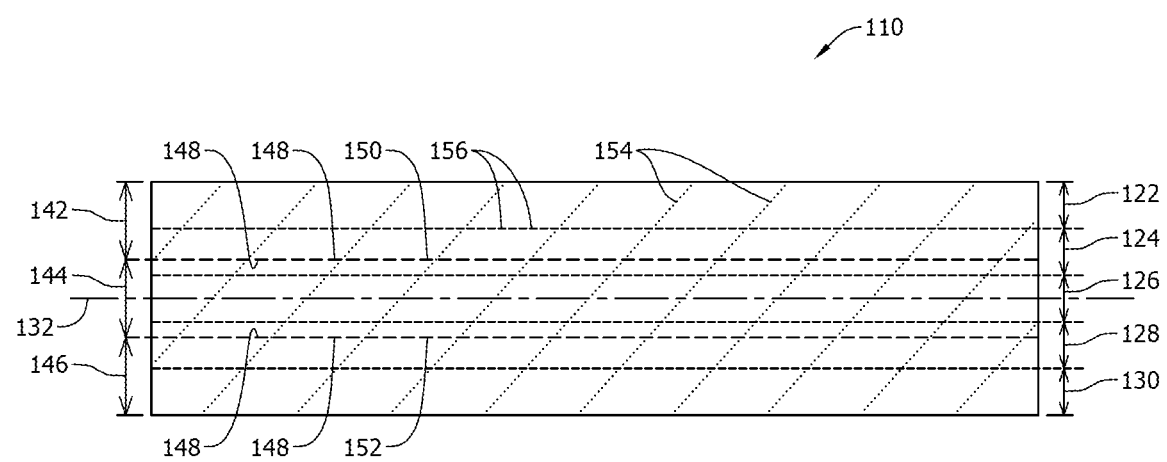
FIG. 6 is a schematic illustration of at least one ply of the multi-layer laminate shown in FIG. 4.

First ply layer 110 will now be described in further detail, and the following is applicable to any ply layer of multi-layer laminate 108 having an oblique fiber orientation. Referring to FIGS. 4 and 6, ply layer 110 is a discontinuous ply including a first section 142, a second section 144, and a third section 146. Each section 142, 144, and 146 has at least one side edge 148, and sections 142, 144, and 146 are arranged side-by-side in series in crosswise dimension 120. For example, first and second sections 142 and 144 are aligned side-by-side such that a first interface 150 defined between the respective side edges 148 is oriented to extend in longitudinal dimension 118, and second and third sections 144 and 146 are aligned side-by-side such that a second interface 152 defined between the respective side edges 148 is oriented to extend in longitudinal dimension 118. The discontinuous 45 degree ply subsections may be aligned edge-to-edge or may be overlapping between the adjacent sections.

In some embodiments, the number of sections that ply layer 110 is formed from is determined based on the desired final shape of composite structure 106. For example, it is believed, without being bound by any particular theory, that counteracting compression and tension forces in the web region of contoured composite structures results in the formation of wrinkles therein. Thus, embodiments of the present disclosure facilitate releasing the counteracting compression and tension forces in each web region of the composite structure to be formed.

In the example embodiment, first interface 150 extends through second region 124 (i.e., the first web region) of multi-layer laminate 108, and second interface 152 extends through fourth region 128 (i.e., the second web region) of multi-layer laminate 108. In one embodiment, first and second interfaces 150 and 152 do not cross over into adjacent regions of multi-layer laminate 108. For example, first and second interfaces 150 and 152 may be located in the center of the respective web regions 124 and 128, or may be located off-center. Alternatively, first and second interfaces 150 and 152 may extend across more than one region of composite structure 106.

Sections 142, 144, and 146 may be pre-cut individual strips that are laid up within multi-layer laminate 108, or may be defined from a sheet of laminate material cut to define the distinct sections, for example. In the example embodiment, ply layer 110 is formed from a plurality of fiber strands 154 extending in the oblique fiber orientation. Thus, in one embodiment, cut strand ends 156 of fiber strands 154 define the cut side edges 148 of sections 142, 144, and/or 146.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. A composite structure comprising:
a multi-layer laminate comprising a plurality of regions each oriented out of plane relative to an adjacent region, and each extending in a longitudinal dimension of the multi-layer laminate,
wherein the multi-layer laminate comprises at least one ply layer having an oblique fiber orientation relative to the longitudinal dimension, and
wherein the at least one ply layer comprises a first section and a second section each having a side edge, the first and second sections aligned side-by-side such that a first interface defined between the respective side edges is oriented to extend in the longitudinal dimension.

2. The composite structure in accordance with claim 1, wherein the first and second sections are configured to permit selective relative movement therebetween prior to curing of the multi-layer laminate.

3. The composite structure in accordance with claim 1, wherein the first interface extends only through a first of the plurality of regions, and not through a second of the plurality of regions.

4. The composite structure in accordance with claim 1, wherein the composite structure is oriented to define at least one curved section in the longitudinal dimension, the at least one ply layer extending within the at least one curved section.

5. The composite structure in accordance with claim 1, wherein the composite structure is oriented to define at least one curved section and at least one straight section in the longitudinal dimension, wherein the at least one ply layer extends only within the at least one curved section, and not within the at least one straight section.

6. The composite structure in accordance with claim 1, wherein the at least one ply layer further comprises a third section having a side edge, the second and third sections aligned side-by-side such that a second interface defined therebetween is oriented to extend in the longitudinal dimension.

7. The composite structure in accordance with claim 6, wherein the plurality of regions comprises a first region, a second region, a third region, a fourth region, and a fifth region arranged in series in a crosswise dimension of the multi-layer laminate, wherein the first interface extends through the second region and the second interface extends through the fourth region.

8. The composite structure in accordance with claim 1, wherein the multi-layer laminate is formed from a plurality of ply layers having oblique fiber orientations, wherein each ply layer comprises a first section and a second section, and wherein each of the first and second sections have a side edge, the first and second sections of each ply layer aligned side-by-side such that a first interface defined between the respective side edges is oriented to extend in the longitudinal dimension.

9. The composite structure in accordance with claim 8, wherein the plurality of ply layers having oblique fiber orientations are separated from each other in a layup sequence of the multi-layer laminate by at least one other ply layer having the same or a different fiber orientation.

10. The composite structure in accordance with claim 1, wherein the at least one ply layer comprises a plurality of fiber strands extending in the oblique fiber orientation, wherein cut strand ends of the plurality of fiber strands define the side edge of the at least one ply layer.

11. An aircraft comprising:
a stringer comprising:
a multi-layer laminate comprising a plurality of regions each oriented out of plane relative to an adjacent region, and each extending in a longitudinal dimension of the multi-layer laminate,
wherein the multi-layer laminate comprises at least one ply layer having an oblique fiber orientation relative to the longitudinal dimension, and
wherein the at least one ply layer comprises a first section and a second section each having a side edge, the first and second sections aligned side-by-side such that a first interface defined between the respective side edges is oriented to extend in the longitudinal dimension.

12. The aircraft in accordance with claim 11, wherein the first and second sections are configured to permit selective relative movement therebetween prior to curing of the multi-layer laminate.

13. The aircraft in accordance with claim 11, wherein the first interface extends only through a first of the plurality of regions, and not through a second of the plurality of regions.

14. The aircraft in accordance with claim 11, wherein the stringer is oriented to define at least one curved section in the longitudinal dimension, the at least one ply layer extending within the at least one curved section.

15. The aircraft in accordance with claim 11, wherein the stringer is oriented to define at least one curved section and at least one straight section in the longitudinal dimension, wherein the at least one ply layer extends only within the at least one curved section, and not within the at least one straight section.

16. A method of forming a composite structure, the method comprising:
forming a multi-layer laminate having a plurality of regions defined in a crosswise dimension of the multi-layer laminate, the multi-layer laminate formed from at least one ply layer having an oblique fiber orientation relative to a longitudinal dimension of the multi-layer laminate, wherein the at least one ply layer comprises a first section and a second section each having a side edge, the first and second sections aligned side-by-side such that a first interface defined between the respective side edges is oriented to extend in the longitudinal dimension; and
forming the multi-layer laminate into a desired shape, wherein the forming comprises:
orienting each of the plurality of regions of the multi-layer laminate out of plane relative to an adjacent region, and
orienting the multi-layer laminate to define at least one curved section in the longitudinal dimension, wherein the first and second sections are configured to permit selective relative movement therebetween, prior to curing of the multi-layer laminate, as the at least one curved section is formed.

17. The method in accordance with claim 16, wherein forming into the desired shape comprises performing at least one of a punch forming, a drape forming, a lash forming, a vacuum forming, and a resin transfer forming process.

18. The method in accordance with claim 16, wherein forming the multi-layer laminate comprises aligning the first and second sections such that the first interface extends only through a first of the plurality of regions, and not through a second of the plurality of regions.

19. The method in accordance with claim 16, wherein forming the multi-layer laminate comprises orienting the multi-layer laminate to define at least one curved section and at least one straight section in the longitudinal dimension, wherein the at least one ply layer extends only within the at least one curved section, and not within the at least one straight section.

20. The method in accordance with claim 16, wherein the at least one ply layer comprises a plurality of fiber strands extending in the oblique fiber orientation, wherein cut strand ends of the plurality of fiber strands define the side edge of the at least one ply layer.

* * * * *